Patented June 7, 1927.

1,631,113

UNITED STATES PATENT OFFICE.

EDWARD ANDERSON, OF DAYTON, OHIO, ASSIGNOR TO THE A. A. SIMONDS-DAYTON COMPANY, OF DAYTON, OHIO, A CORPORATION OF OHIO.

BOND FOR ELASTIC GRINDING WHEELS AND METHOD OF APPLYING THE SAME.

No Drawing.   Application filed March 21, 1925.   Serial No. 17,437.

This invention relates to the manufacture of elastic grinding wheels, and it consists in a novel compound for cementing or bonding the grains of abrasive material together, and in a novel method of coating the grains with bonding material, preparatory to forming the wheels.

In wheels of this kind the grains of abrasive material are united by a bond comprising materials which melt at comparatively low temperatures but attain a set at slightly higher temperatures. The material most commonly used for the bond is shellac, which melts at about 200 degrees Fahrenheit, and preparation of the abrasive material consists in coating the grains complete with the shellac. Heretofore this has been done by the application of heat sufficient to melt the shellac. The abrasive and shellac, the latter generally being pulverized, are put into a mixer, and while maintained at a temperature high enough to melt the shellac the mass is thoroughly mixed. As the mass cools the shellac binds the grains together, forming one or more lumps, which then must be broken up, and otherwise treated to restore it to its former granular condition.

One object of my present invention is to keep the grains from adhering and forming these lumps. Another object is to keep the coating on the grains smooth and of uniform thickness, while another object is to reduce the amount of material necessary to obtain a superior coating on the grains. Still another object is to increase the strength, uniformity and elasticity of the wheels.

I shall first describe my method of coating the abrasive material. Instead of rendering the shellac fluid by means of heat I dissolve it with a volatile solvent, preferably alcohol. The granular abrasive material and the required quantity of dissolved shellac, together with such other ingredient or ingredients as are to be used, are then put into a mixer and stirred until the solvent has evaporated from the shellac; in other words, until the mass is dry. By this means the grains are kept separated and the material is ready to go at once into molds in which it is pressed into the required shape and set in that shape by the application of heat.

The mixing or stirring may be done in any suitable mixing machine; I have found an ordinary dough mixer, such as is used by bakers, satisfactory for the purpose. As these are well known it is not necessary to illustrate one. The important thing is to keep the grains of abrasive material in constant relative motion; that is, each grain constantly in motion relative to the other grains. In order to hasten the drying I heat the mass to a temperature below the melting point of shellac. This is a useful though not essential step in the method. After the grains are evenly coated the continued stirring and relative movement of the grains serves the double purpose of keeping the grains from sticking together and of aerating the mass, thus facilitating the evaporation. By keeping the grains separated the coating is made more uniform and smooth than is possible with the old method of coating the grains, and less coating material is used.
Furthermore, the wheels made from material thus coated are more uniform in quality.

As I have previously stated, my invention embraces a novel compound. This compound comprises shellac and linseed oil, preferably boiled. The preferred though not the only manner of compounding these ingredients is as follows: After the granular material and dissolved shellac have been placed in the mixer and stirred to some extent, the oil is added. While the proportions are susceptible of considerable variation, I have obtained excellent results using five pounds of oil to one hundred pounds of dry shellac. For some purposes the compound is improved by the addition of flour of sulphur. The quantity of this also may be varied, but one-half pound of sulphur to one hundred pounds of dry shellac yields good results. If preferred the desired amount of sulphur may be introduced in the form of sulphur chloride (S Cl). Adding linseed oil, or linseed oil and sulphur, to the shellac increases the strength and elasticity of the wheels and renders them more uniform in quality. Altho I prefer to evaporate the solvent at a temperature below the melting point of shellac, the benefits derived from the combination are not lost by heating the mass above the melting point of shellac while the solvent is being evaporated.

What I claim as my invention is as follows:

1. The method of coating grains of abrasive material, which comprises dissolving shellac in a volatile solvent, putting the required quantities of the solution and granulated abrasive material into a mixer and mixing thoroughly, adding a desired quantity of linseed oil and continuing the mixing constantly until the solvent has evaporated.

2. The method of coating grains of abrasive material, which comprises dissolving shellac in a volatile solvent, putting the required quantities of the solution and granulated abrasive material into a mixer and mixing thoroughly, adding a desired quantity of linseed oil and continuing the mixing constantly until the solvent has evaporated, maintaining the mixture meanwhile at a temperature below the melting temperature of shellac.

3. The method of coating grains of abrasive material with a substance which melts at a comparatively low temperature but attains a set at a higher temperature, which method comprises dissolving said substance and mixing required quantities of the solution and of granulated abrasive, keeping grains constantly in relative motion until the solvent has evaporated and the grains are dry.

4. The method of coating grains of abrasive material with a substance which melts at a comparatively low temperature but attains a set at a slightly higher temperature, which method comprises applying a coating of such substance to the grains and then keeping the grains constantly in motion with reference to each other until the coating hardens.

5. The method of combining shellac and other ingredients to form a bond for elastic grinding wheels, which comprises dissolving the shellac with a volatile solvent, adding the other ingredients, mixing and concurrently evaporating the solvent.

6. The method of coating grains of abrasive material, which comprises dissolving shellac in a volatile solvent, putting the required quantities of the solution and granulated abrasive material into a mixer and mixing thoroughly, adding a desired quantity of linseed oil and continuing the mixing constantly until the solvent has evaporated, heating the mixture to a temperature above the melting point of shellac during the mixing operation.

EDWARD ANDERSON.